United States Patent [19]
Borel

[11] Patent Number: 4,621,875
[45] Date of Patent: * Nov. 11, 1986

[54] BALL BUSHING

[75] Inventor: Denis Borel, Wallisellen, Switzerland

[73] Assignee: SRO Kugellagerwerke J. Schmidt-Roost AG, Switzerland

[ * ] Notice: The portion of the term of this patent subsequent to Mar. 27, 2001 has been disclaimed.

[21] Appl. No.: 691,670

[22] Filed: Jan. 15, 1985

[30] Foreign Application Priority Data

Feb. 13, 1984 [EP] European Pat. Off. .......... 8410151.7

[51] Int. Cl.⁴ ............................................. F16C 29/06
[52] U.S. Cl. .................................................... 384/45
[58] Field of Search ....................... 308/6 C, 6 R, 6 A; 464/168

[56] References Cited

U.S. PATENT DOCUMENTS

| | | | |
|---|---|---|---|
| 4,427,240 | 1/1984 | Teramachi | 308/6 C |
| 4,438,985 | 3/1984 | Borel | 308/6 C |
| 4,514,017 | 4/1985 | Walter et al. | 308/6 C |

FOREIGN PATENT DOCUMENTS 527378 10/1972 Switzerland .

*Primary Examiner*—Lenard A. Footland
*Attorney, Agent, or Firm*—Ostrolenk, Faber, Gerb & Soffen

[57] ABSTRACT

A ball bushing for mounting on a shaft is disclosed which is freely movable relative to the shaft in both axial directions as well as in one direction of rotation and which is sluggishly movable in the second direction of rotation, but without locking. The ball bushing includes a sleeve made of a deformable material. Closed channels are defined in the sleeve, each having two axially extending portions connected at both ends by curved portions. One axially extending portion contains a row of load-bearing balls, adjacent to which is a steel needle. The steel needle is positioned so that the center point of each of the load-bearing balls is positioned to one side of the line through the axes of the shaft and the needle, that side being toward the second axially extending portion of the same closed channel. Therefore, the lines connecting the axes of the shaft and needle to the center point of each of the load-bearing balls form an angle, the angle being preferably between 174° and 178°. The angle may be constant for all the load-bearing balls, or may decrease toward the ends of the needle. The needle may have a diameter which tapers down from its center towards its ends.

11 Claims, 5 Drawing Figures

BALL BUSHING

BACKGROUND OF THE INVENTION

1. Field of the Invention

The present invention relates to a ball bushing for mounting around a shaft.

2. Description of the Prior Art

U.S. Pat. No. 4,438,985, assigned to the assignee of the present invention, discloses a ball bushing which is freely movable in both of its axial directions as well as in both directions of rotation. The ball bushing includes a cylindrical sleeve formed by shaping a deformable material. One row of load-bearing balls and one row of non-load-bearing balls are arranged in each of a number of closed ball channels within the sleeve. Each of these ball channels includes two separate axially extending portions and two separate curved portions connecting the axially extending portions together. The bushing also includes a paraxial steel needle for each ball channel.

In manipulating apparatus, also known as manipulators or robots, it is sometimes necessary to transmit force in the direction of rotation, with freely movable guidance in both axial directions, such as with a ball bushing.

Longitudinally displaceable operating tools, devices and coverings which are mounted for free movement in both axial directions and in one direction of rotation and are locked in the second direction of rotation by locks, ratchets or the like are also known in textile machines. Such locks, ratchets, and the like must be installed, adjusted and maintained, together with the mountings in which they are provided. If improperly adjusted, they may cause damage since they are fastened "non-yieldably" in the loaded direction.

SUMMARY OF THE INVENTION

One object of the invention is to provide a ball bushing which can be mounted around a shaft and which is freely movable in both axial directions as well as in one direction of rotation while it is sluggishly movable in the other direction of rotation, but not locked.

This and other objects are achieved by the ball bushing of the invention in which the non-load-bearing balls are arranged in a direction of rotation from the load-bearing balls. The centers of the load-bearing balls are positioned in the direction of rotation from the line between the center axes of the respective needle and the shaft. More specifically, the lines connecting the center point of each load-bearing ball to the center axis of the needle and to the center axis of the shaft form an angle pointing in the direction of rotation which is less than 180° but greater than 170°. It is advantageous for the angle to have a value between 174° and 178°.

This angle may advantageously vary for differently positioned load-bearing balls. The angle may have its maximum for the balls adjacent the center of the steel needle and may become continuously smaller for the balls towards the ends of the steel needle. The axially extending portion of the ball channel in the sleeve which receives the load-bearing balls may be curved to provide this feature. It is also advantageous to shape the steel needle so that its diameter tapers down towards the ends of the steel needle. These features, together with the inherent flexibility of the sleeve, make it possible to compensate for manufacturing tolerances within a ball bushing.

Similarly, a slight sagging of the shaft during operation is compensated for because such sagging has no effect on the number of the loading-bearing balls which are actually bearing the load when the sagging occurs. All the load-bearing balls are used for bearing the load.

Other objects, features and advantages of the invention will be apparent from the following description, together with the accompanying drawings and the appended claims.

BRIEF DESCRIPTION OF THE DRAWINGS

One illustrative embodiment of the ball bushing of the invention is shown in the drawing, in which.

DETAILED DESCRIPTION OF THE PREFERRED EMBODIMENTS

The ball bushing of the invention may be embodied in a variation of the ball bushing disclosed in U.S. Pat. No. 4,438,985, discussed above and incorporated herein by reference.

Figure 1:
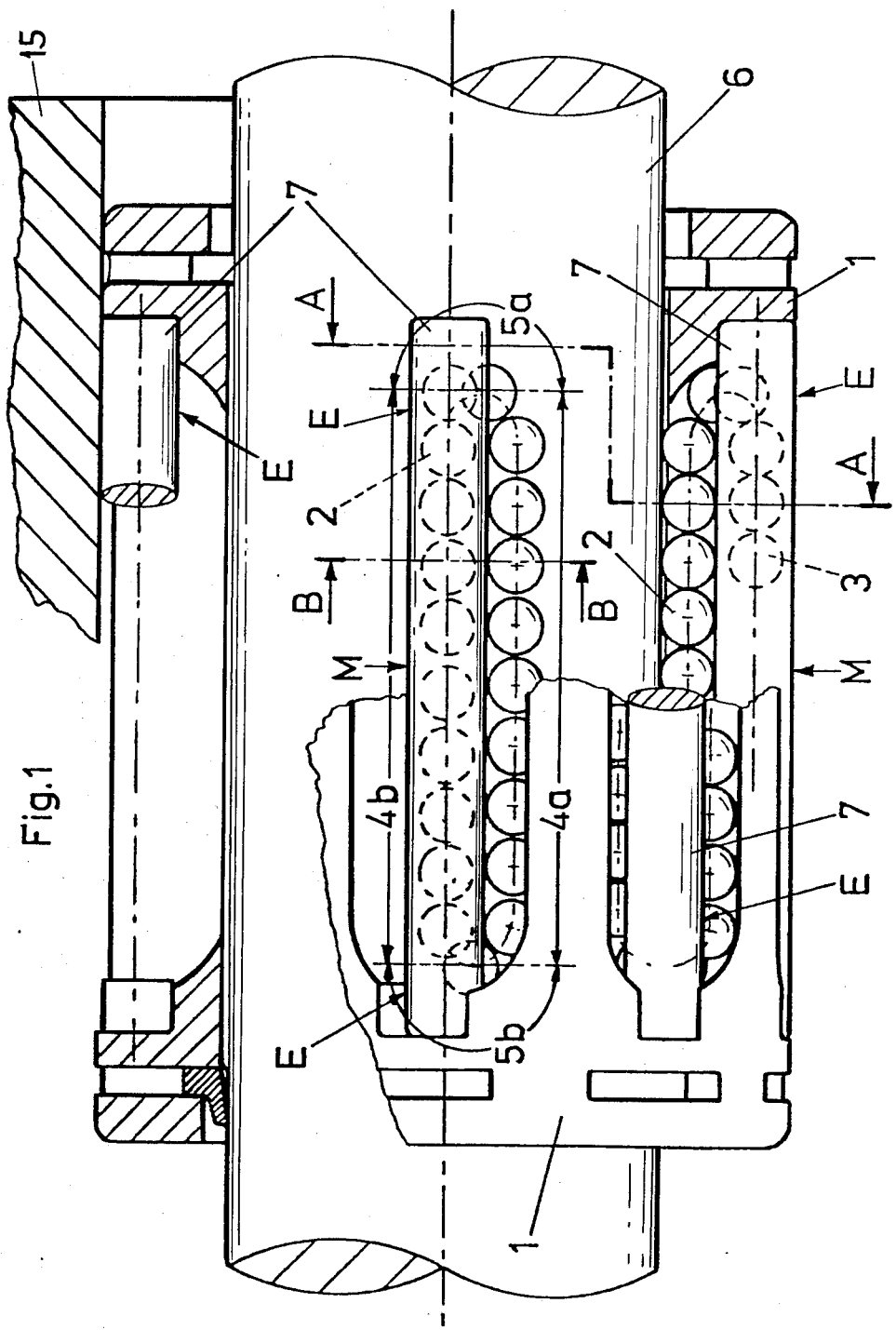
FIG. 1 is a side view, partially in section, of a ball bushing according to the invention, mounted on a portion of the shaft.

FIG. 1 shows a ball bushing according to the invention mounted on shaft 6, only part of which is shown. The ball bushing includes cylindrical sleeve 1 made of a deformable material, preferably plastic. Closed ball channels are arranged in sleeve 1, each channel containing a row of load-bearing balls 2 and a row of non-load-bearing balls 3. Each ball channel includes two axially extending sections 4a and 4b and two curved sections 5a and 5b connecting sections 4a and 4b together at each end. Section 4a contains the row of non-load-bearing balls 3, while section 4b contains the row of load-bearing balls 2.

Figure 5:
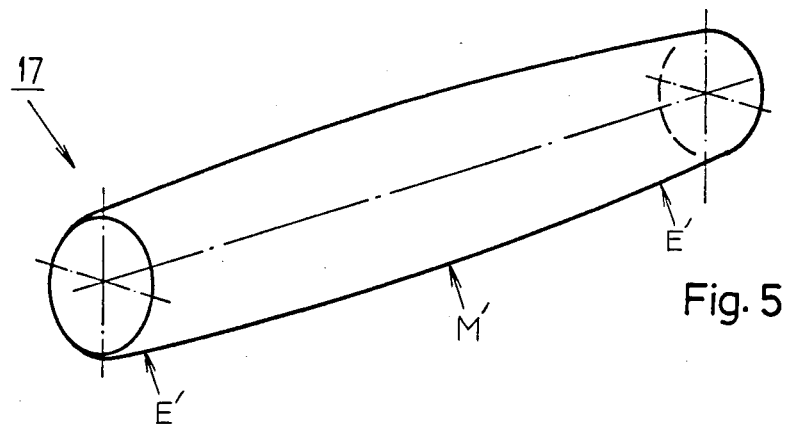
FIG. 5 is a perspective view of a needle according to another alternative embodiment of the invention.

For each ball channel, a steel needle 7, which is parallel to the shaft 6, is mounted in sleeve 1. Each of these steel needles 7 may have a constant diameter from its center M to its ends E, as shown in FIG. 1. In another embodiment, as shown in FIG. 5, each of the steel needles 17 may have a different shape such that the diameter decreases or tapers down from center M' towards both ends E'. The steel needles 7 are so arranged in sleeve 1 that each needle 7 contacts one side of a row of load-bearing balls 2 in section 4b of the respective ball channel. In this way, the working region of the rows of load-bearing balls 2 is formed by the contact of the balls 2 with the steel needles 7 on one side and with the shaft 6 on the other side, as shown in cross section in FIGS. 2 and 3.

Figure 2:
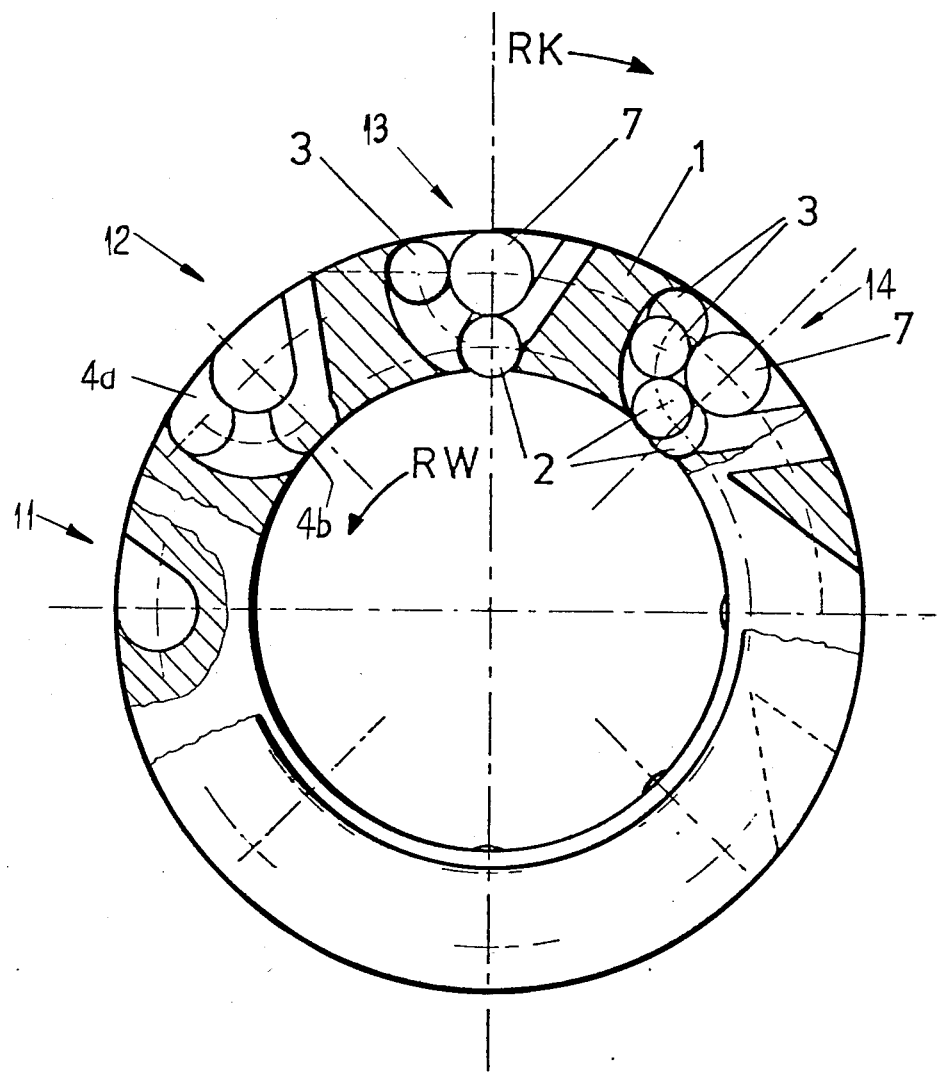
FIG. 2 is a partial cross sectional view through the ball bushing of FIG. 1, along the line A—A.

FIG. 2 shows the ball bushing of FIG. 1 in partial cross section, with four ball channels 11–14 being shown at different points of cross section. Channel 11 is shown in the area in which the end of the respective needle 7 is to be mounted. Channel 12 is shown in the area in which parital sections 4a and 4b extend parallel to the axis, but with the respective needle 7 and balls 2 and 3 omitted. Channel 13 is shown in the same area as channel 12, but with the respective needle 7 and balls 2 and 3 shown. Channel 14 is shown in the area in which curved section 5a connects partial sections 4a and 4b, permitting balls 2 and 3 to move between the partial sections 4a and 4b.

Figure 3:
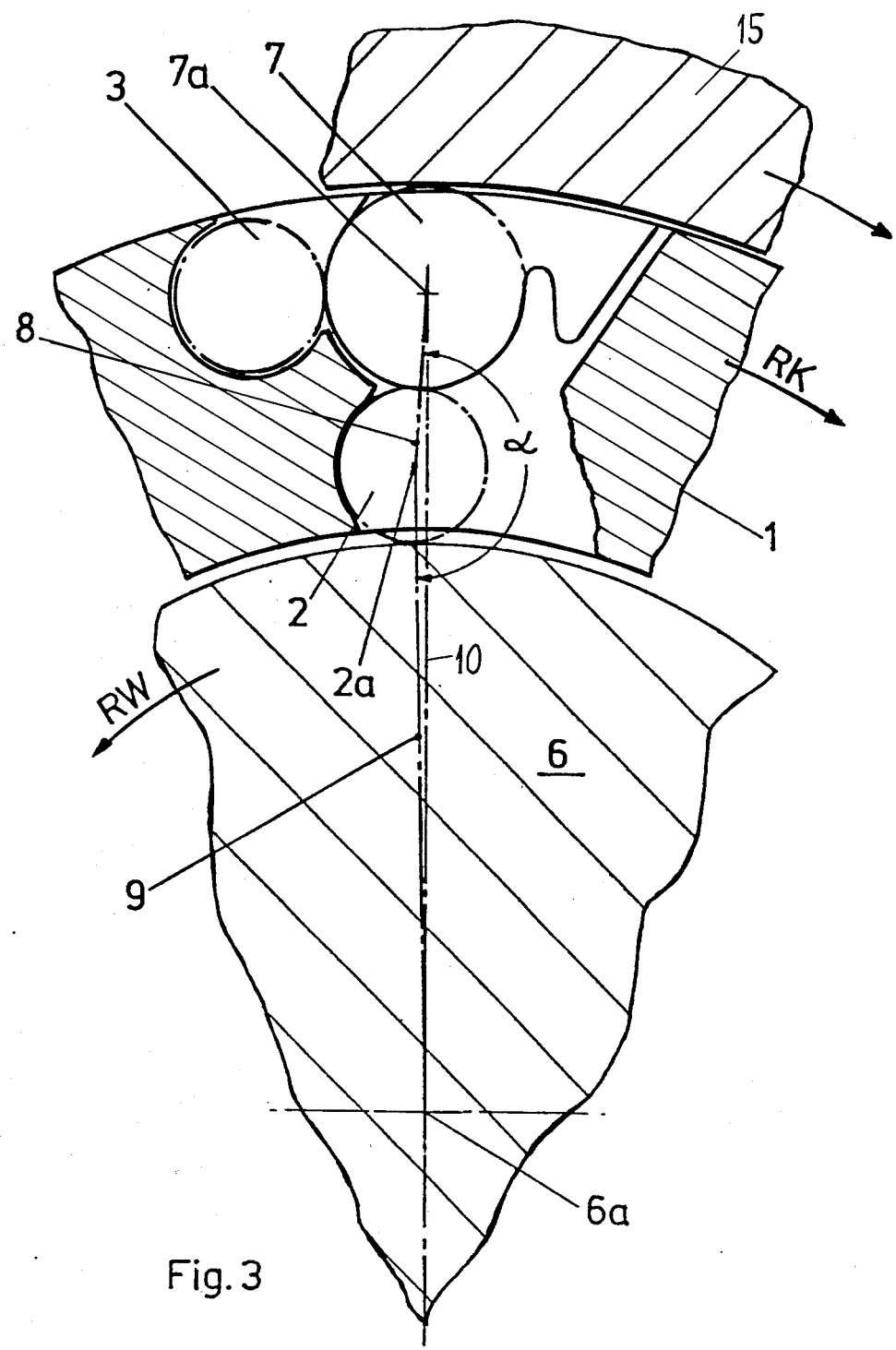
FIG. 3 is an enlarged partial cross sectional view through the ball bushing of FIG. 1, along the line B—B.

As shown in FIG. 3, line 8 connects the center point 2a of each ball 2 with the center axis 7a of the respective steel needle 7 and line 9 connects the ball center point 2a with the center axis 6a of the shaft 6. Load-bearing balls 2 are so arranged in each channel of the ball bushing that line 8 and line 9 form an angle at ball center point 2a whose vertex points in the direction of rotation toward the row of non-load-bearing balls 3. In other words, the center point 2a of each ball 2 is positioned on one side of line 10 through the center axes 6a and 7a, toward the non-load bearing balls 3. It has been discovered that this arrangement permits sleeve 1 to turn freely relative to shaft 6 in one direction but causes it to turn only sluggishly in the other direction of rotation, as discussed below. To obtain these results, angle a must be less than 180° but greater than 170°, and it is preferably between 174° and 178°. The position of balls 2 is accomplished by positioning needle 7 in relation to the shape of the sides of section 4b of each channel. In other words, the sides of section 4b hold each ball 2 in a position like that shown in FIG. 3 relative to the center axis of needle 7.

Figure 4:
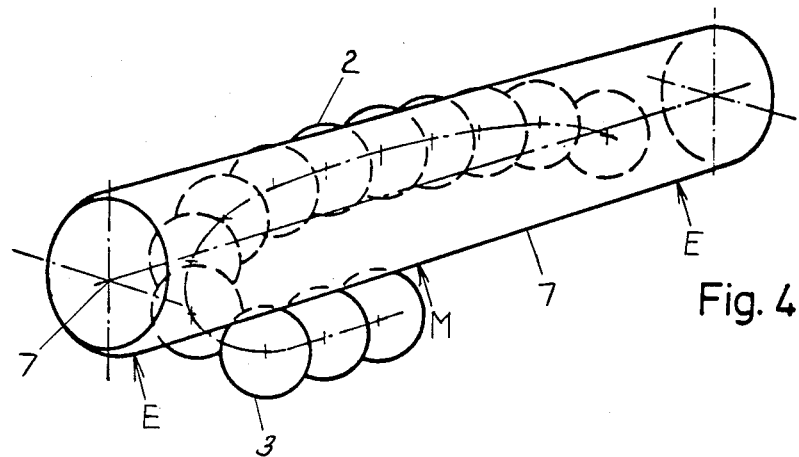
FIG. 4 is a perspective view of parts of an alternative embodiment of the invention.

Although the angle a for each of the load-bearing balls 2 may be equal as shown in FIG. 1, it may also vary as the position of the ball varies along the length of needle 7, as shown in FIG. 4. If axially extending section 4b of the ball channel (shown in FIG. 1) has an appropriate curvature, for example, angle a may be at its maximum for the balls 2 adjacent the center M of the needle 7 and may decrease continuously as the balls 2 are positioned towards the ends E of needle 7. As a result, the row of load-bearing balls 2 will follow a curved line as shown in FIG. 4, while the row of non-load-bearing balls 3 may follow a straight line parallel to the center axis 7a of needle 7.

A ball bushing according to the invention is freely movable in both axial directions and in the direction of rotation RK of the ball bushing or RW of the shaft 6, as shown in FIGS. 2 and 3. In the direction opposite the directions of rotation RK and RW, relative movement of the ball bushing around the shaft 6 is sluggish, without, however, the bushing being locked in relation to the shaft. This sluggishness will occur because the turning of shaft 6 in a direction opposite direction RW will cause each load-bearing ball 2 to be squeezed slightly between needle 7 and shaft 6 as it turns against needle 7. The angle a should therefore be large enough that the balls 2 will not lock, but not so large that balls 2 will turn freely. The vertex of angle a must point toward section 4a to permit free movement of the balls between section 4b and curved sections 5a and 5b.

If such sluggishness is desired in both directions of rotation, i.e., both in direction RK or RW as shown in FIGS. 2 and 3 and in the direction opposite to RK or RW, this can be achieved by simply arranging two such ball bushings axially adjacent to each other. One of the two ball bushings is turned in relation to the other by 180°, so that the sluggish direction of rotation for each bushing is opposite that of the other.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A ball bushing for mounting around a shaft, comprising:

a cylindrical sleeve of a deformable material for fitting around a shaft having a center axis, the sleeve having a plurality of closed channels defined therein, each closed channel including first and second axially extending portions extending generally parallel to the center axis of the shaft between first and second ends and first and second curved portions disposed at the first and second ends, respectively, each curved portion connecting the first and second axially extending portions together, the second axially extending portion being arranged in a direction of rotation about the center axis of the shaft from the first axially extending portion;

a plurality of balls in the closed channel for providing a row of load-bearing balls in the first axially extending portion and a row of non-load-bearing balls in the second axially extending portion; and a plurality of steel needles, each having a respective center axis extending generally parallel to the center axis of the shaft, each steel needle being positioned directly adjacent and at least partially engaging the load-bearing balls in a respective one of the closed channels such that the lines connecting the center point of each load-bearing ball to the center axis of the shaft and to the center axis of the respective steel needle form a respective angle with a vertex pointing in the direction of rotation, each of the respective angles being less than 180° and greater than 170°.

2. The ball bushing of claim 1 in which each of the respective angles is between 174° and 178°.

3. The ball bushing of claim 1 in which the respective angles formed by the lines at the center points of all of the balls in each first axially extending portion are equal.

4. The ball bushing of claim 1 in which each steel needle has first and second ends and a center therebetween, the respective angles at the center points of balls in the respective first axially extending portion being at a maximum adjacent the center of that steel needle and decreasing near the first and second ends of that needle.

5. The ball bushing of claim 1 in which each steel needle has first and second ends and a center therebetween, the diameter of each steel needle tapering from its center towards each of its first and second ends.

6. A ball bushing for mounting around a shaft, comprising:

a sleeve for fitting around a shaft having a center axis, the sleeve having a plurality of closed channels defined therein, each closed channel including first and second axially extending portions extending generally parallel to the center axis of the shaft between first and second ends and being connected together at the first and second ends, the second axially extending portion being arranged in a direction of rotation about the center axis of the shaft from the first axially extending portion;

a plurality of balls in the closed channel for providing a row of load-bearing balls in the first axially extending portion; and a plurality of needles, each having a respective center axis extending generally parallel to the center axis of the shaft, each needle being positioned directly adjacent and at least partially engaging the load-bearing balls in a respective one of the closed channels such that the center pont of each load-bearing ball is positioned in the direction of rotation from a line through the center axis of the shaft and the center axis of the respective needle.

7. The ball bushing of claim 6 in which the lines connecting the center point of each ball in each first axially extending portion to the center axis of the shaft and to the center axis of the respective needle form a respective angle with a vertex pointing in the direction of rotation, each of the respective angles being less than 180° and greater than 170°.

8. The ball bushing of claim 7 in which each of the respective angles is between 174° and 178°.

9. The ball bushing of claim 7 in which the respective angles formed by the lines at the center points of all of the balls in each first axially extending portion are equal.

10. The ball bushing of claim 7 in which each needle has first and second ends and a center therebetween, the respective angles at the center points of balls in the respective first axially extending portion being at a maximum adjacent the center of that needle and decreasing near the first and second ends of that needle.

11. The ball bushing of claim 6 in which each needle has first and second ends and a center therebetween, the diameter of each needle tapering from its center towards each of its first and second ends.

* * * * *